United States Patent [19]
Navarrete

[11] Patent Number: 5,175,893
[45] Date of Patent: Jan. 5, 1993

[54] DUAL FLUSH VALVE ASSEMBLY

[76] Inventor: Raul A. Navarrete, 44 Perita Dr., Daly City, Calif. 94015

[21] Appl. No.: 699,708

[22] Filed: May 14, 1991

[51] Int. Cl.$^5$ .......................... E03D 1/14; E03D 5/09
[52] U.S. Cl. ........................................ 4/326; 4/412; 4/414; 285/319
[58] Field of Search .................. 4/326, 327, 393, 412, 4/414; 285/319

[56] References Cited

U.S. PATENT DOCUMENTS

| | | | |
|---|---|---|---|
| 1,016,714 | 2/1912 | Schulte | 4/414 |
| 1,570,681 | 1/1926 | Kirkham | 4/378 |
| 1,623,109 | 4/1927 | Haas | 4/412 |
| 2,099,984 | 11/1937 | Lundquist | 285/382 X |
| 3,186,007 | 6/1965 | Falotico | 4/327 |
| 3,912,009 | 10/1975 | Davis, Jr. | 285/319 X |
| 4,020,508 | 5/1977 | Morgan | 4/326 |
| 4,096,591 | 6/1978 | Awis | 4/326 |
| 4,122,564 | 10/1978 | Addicks et al. | 4/326 |
| 4,172,299 | 10/1979 | del Pozo | 4/326 |
| 4,173,801 | 11/1979 | Bresnyan | 4/326 |
| 4,504,984 | 3/1985 | Burns | 4/326 |
| 4,829,605 | 5/1989 | Agostino | 4/326 |

Primary Examiner—Henry J. Recla
Assistant Examiner—Robert M. Fetsuga
Attorney, Agent, or Firm—T. R. Zegree

[57] ABSTRACT

An improved dual flush valve assembly adapted for connection with a toilet tank provides a partial or full flush of water. The assembly comprises two actuating lever arms and three chains depending from the levers for connection with two flap valves. The flap valves are mounted on a hollow body having a hollow adapter for connection with a discharge pipe in a bottom wall of the tank. The adapter includes a plurality of resilient finger-like members which engage an interior of the discharge pipe. The assembly produces substantial savings in water consumption.

15 Claims, 2 Drawing Sheets

FIG. 3
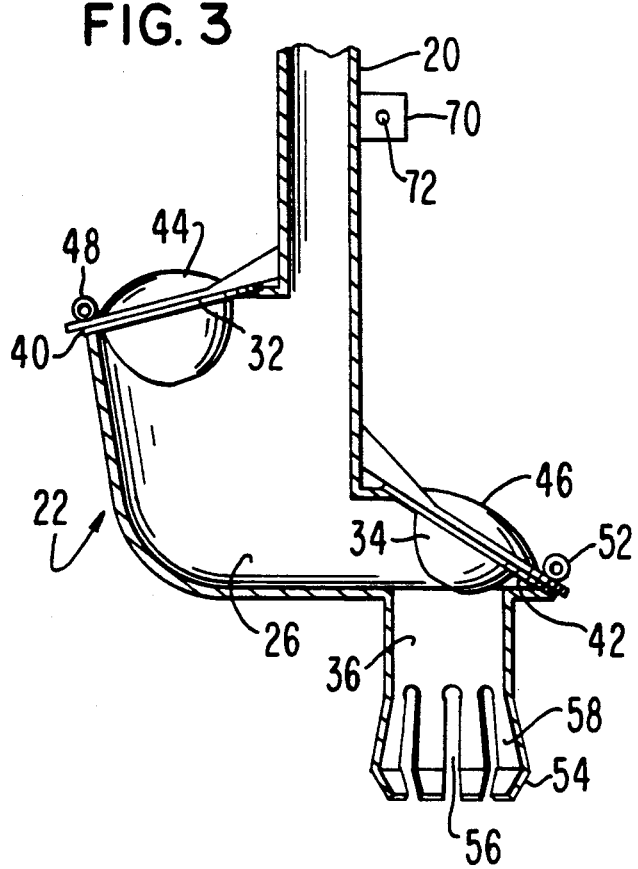
FIG. 4
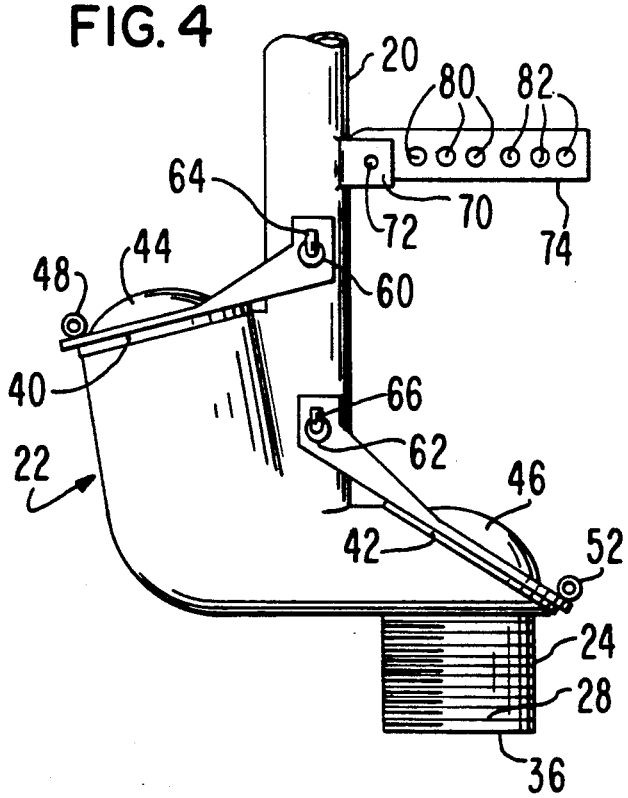
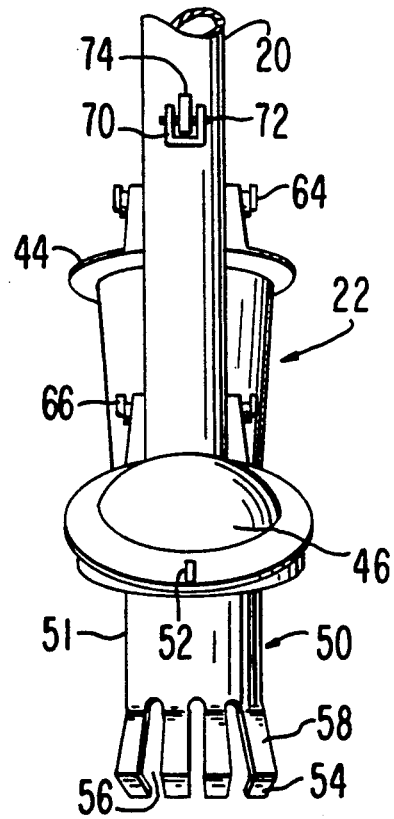
FIG. 5

DUAL FLUSH VALVE ASSEMBLY

BACKGROUND OF THE INVENTION

This invention relates to an improved dual flush valve assembly for a toilet tank. More particularly, the invention relates to a valve assembly, the construction of which includes a hollow body provided with a pair of pivotally mounted lever arms actuating a pair of valves adapted for causing a partial or full discharge of water from the tank through an opening in the bottom wall thereof.

As is well known, a severe water shortage exists in the United States, particularly in the State of California, due to continued statewide draught. As a result, mandatory water conservation programs have been established in many areas, such programs including penalties assessed for excessive water usage. Although various measures attempting to utilize water more efficiently and thus reduce its overall consumption have been suggested, the total amount of water used still remains much too high. Moreover, it is projected that water shortage may become more acute in the future.

In an attempt to at least partially alleviate this situation, certain water-saving devices for toilet tanks have been proposed and described in the patent literature. For example, U.S. Pat. No. 2,731,647 to Groth et al. describes a dual type flush valve device comprising a pair of vertically disposed valves actuated by a handle movable in clockwise and counterclockwise directions. U.S. Pat. No. 3,375,531 to Lake discloses a device having a pair of transversely disposed valves, each valve connected to a separate flush handle. U.S. Pat. No. 3,758,893 to Smolinski teaches a toilet flush system for providing light or heavy flushes by twisting a selector clockwise or pressing it inwardly. U.S. Pat. No. 3,768,103 to Robluson describes a toilet flush valve assembly comprising a pair of valves mounted on an upstanding straight length water discharge pipe also functioning as an overflow pipe. U.S. Pat. No. 3,795,016 to Eastman teaches a toilet water tank having two valves operable by two actuator arms, each arm coupled with a separate handle. U.S. Pat. No. 3,918,105 to Young describes two inlets in a toilet tank which are closable by hydraulically operated lids. U.S. Pat. No. 4,042,982 to Contreras discloses a toilet flush valve assembly having two intersecting conduits, each connected with a valve assembly which prevents crossflow of water from one conduit through the other conduit. U.S. Pat. No. 4,096,591 to Awis teaches a dual flush valve system operable by a flush handle rotatable in opposite directions. U.S. Pat. No. 4,110,850 to Tadei describes a flush valve assembly having a pair of valves actuated by two separate handles. U.S. Pat. No. 4,122,564 to Addicks et al. shows a dual flush valve system operated by a handle rotatable in clockwise and counterclockwise directions. U.S. Pat. No. 4,504,984 to Burns describes a two-stage toilet flush valve assembly comprising a single flush lever connected to both valves; and U.S. Pat. No. 4,829,605 to Agostino discloses a system having two valves and two arms connected to two separate handles.

While the aforementioned patents disclose the general concept of various toilet flush mechanisms having different structures, the valve assembly of the present invention provides a new approach to the structure thereof which offers certain advantages over the prior art devices.

OBJECTS OF THE INVENTION

In view of the foregoing, it is the principal object of this invention to provide an improved dual flush valve assembly adapted for connection with a conventional toilet tank.

Another object of the invention involves a novel dual flush valve device which provides a partial or a full flush capability thereby reducing water usage in a household or elsewhere.

A further object of the invention is the provision of a flush valve assembly which includes a unitary hollow body having two flap valves connected with a novel actuating mechanism.

A still further object of the invention is to provide a dual flush toilet tank device which incorporates an adapter connecting the outlet opening of the device with the drain opening in the bottom wall of the tank.

Still another object of the invention is to provide a dual valve assembly of the character described which can be manufactured in volume quantities at a low cost from readily available materials and which can be easily installed in standard toilet tanks.

BRIEF SUMMARY OF THE INVENTION

These and other objects of the present invention will become more fully apparent from the following description when taken in conjunction with the accompanying drawings.

In accordance with the invention, there is provided a dual flush valve assembly adapted for a partial flush or a full flush of water in a tank of a toilet comprising, in combination: a hollow body including an open-top upright overflow tube; an upper inlet disposed in the central portion of said body; a lower inlet disposed closely adjacent the bottom of said tank; a first elongated actuating lever arm connected at one end thereof to a flush handle; a second actuating lever arm mounted on said overflow tube; said flush handle being rotatably mounted on a wall of said tank; an upper flap valve pivotally mounted on said overflow tube for association with said upper inlet; a lower flap valve pivotally mounted on the lower end portion of said overflow tube for association with said lower inlet; a first chain connecting said first actuating arm with said upper flap valve; a second chain connecting said first actuating arm with said second actuating arm; a third chain connecting said second actuating arm with said lower flap valve; and an outlet opening in the bottom portion of said body for connection with discharge pipe connected with the bottom wall of said tank.

BRIEF DESCRIPTION OF THE DRAWINGS

In the accompanying drawings, wherein like reference characters designate corresponding elements throughout the views thereof:

FIG. 3 is a partially sectional front view of the body of the valve assembly including the adapter;

FIG. 4 is a similar partial front view of the assembly mounted in a conventional discharge pipe of a toilet; and FIG. 5 is an exploded partial side view of the assembly illustrating its detached body comprising the adapter prior to the insertion thereof into a discharge pipe of a toilet.

DETAILED DESCRIPTION OF THE INVENTION

Figure 1:
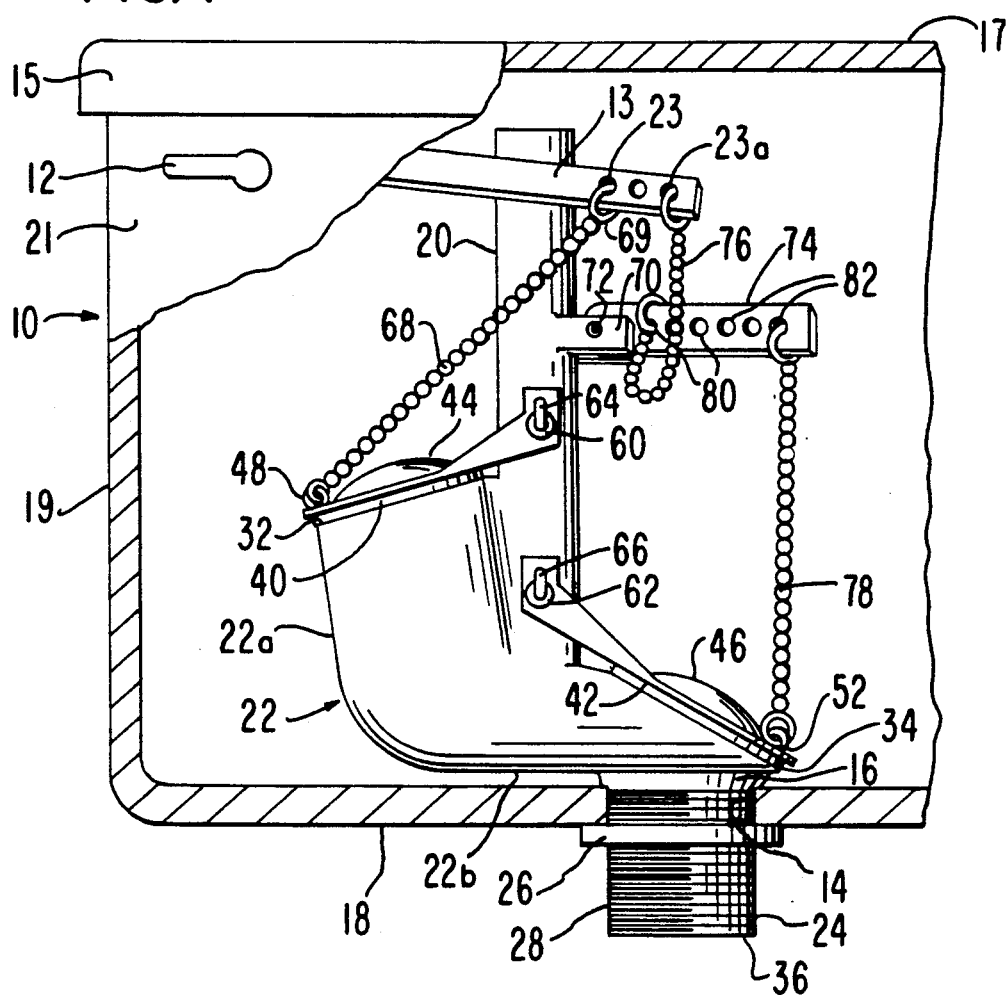
FIG. 1 is a front elevational view of the valve assembly installed in a toilet tank with parts broken away.

Referring now to the drawings, a conventional toilet water tank 10, as shown in FIG. 1, comprises front wall 21, two opposite side walls 19, rear wall (not shown), bottom wall 18 and open top 17 covered with a removable top 15. A flush handle 12 rotatable in one downward direction is secured to front wall 21 by any customary means. Flush handle 12 is connected to first elongated actuating arm 13 extending laterally and inclined downwardly beyond vertically oriented overflow tube 20. The free end portion of arm 13 is provided with a plurality of holes 23 adapted for attachment of two separate chains 68 and 76, the function of which will be described hereinafter. Bottom wall 18 is provided with a conventional drain opening 14 in which is positioned a suitable gasket to insure a liquid-tight seal between lower inlet 34 and drain opening 14. Water is discharged from tank 10 into the toilet bowl through aligned opening 36 in discharge pipe 24 extending downwardly and secured to bottom wall 18 by internally threaded locking nut 26. Bottom wall 18 has also an opening for a filler pipe (not shown) which is needed to fill toilet tank 10 when emptied with water with the aid of a conventional float (not shown).

The main, one-piece, hollow body 22 of the valve assembly is positioned in the interior of tank 10 in generally central portion thereof. As shown in FIGS. 3 and 4, hollow body 22 is substantially of L-shape configuration having a vertically disposed leg portion 22a and a horizontally disposed, by way of a gentle curve, leg portion 22b and includes upright overflow tube 20 positioned generally in the center of body 22 forming an integral part therewith for uninterrupted water circulation inside thereof.

The valve assembly shown in FIGS. 1, 4 and 5 comprises a discharge pipe 24 having external threads 28 for securing it to drain opening 14 by corresponding threads and a gasket 16 inserted therein to provide a leak-proof seal around opening 36 underneath horizontal portion 22b of body 22.

In order to insure a dual flush function of the assembly, two inlets are provided in body 22. Thus upper inlet 32 is disposed at an acute angle to horizontal in the central portion of body 22 at the upper end of its upright leg portion 22a and is arranged in the form of valve seat 40 which is associated with upper flap valve 44 resting thereon in the normal closed position and pivotally connected by its conventional clevis having a pair of apertures 60 to ears 64 projecting from outflow tube 20, as shown in FIGS. 1 and 4. Flap valve 44 pivots to about 45° when in its open position. Lower inlet 34 is disposed likewise at an acute angle to horizontal with the lower edge thereof being situated adjacent top surface of bottom wall 18 in close proximity thereto. Lower flap valve 46 disposed on the other side of overflow tube 20 is pivotally mounted at a lower level than flap valve 44 on the lower end portion of leg 22b of overflow tube 20 by a pair of apertures 62 in its projecting clevis attached to ear 66 projecting from each side of overflow tube 20. Lower flap valve 46 which is vertically spaced from upper valve 44 likewise rests on lower valve seat 42 and is positioned at a less acute angle to horizontal than upper valve 44 to keep lower inlet 34 closed in its normal position.

As illustrated in FIG. 1, the valve assembly according to the invention also comprises two actuating lever arms 13 and 74. As noted hereinabove, first elongated lever arm 13 extending from flush handle 12 beyond upright overflow tube 20 is provided with holes 23 for use in connecting arm 13 with upper valve 44, as well as with second lever arm 74 by means of chains 68 and 76, respectively. Thus chain 68 attached by suitable hook-like fastener 69 to inner hole 23 extends angularly downwardly to upper flap valve 44 provided with upper eyelet 48 for its attachment thereto. Chain 76 attached at the end of arm 13 by a similar fastener to outer hole 23a is suspended downwardly in slack condition when lower valve 46 rests on lower inlet 34 to be linked at its opposite end with one of the holes 80 provided in second lever arm 74, as best shown in FIG. 1, to lift upper valve 44 from upper inlet 32, while lower valve 46 still covers lower inlet 34.

An important feature of the invention is the disposition of laterally extending second lever arm 74 which is markedly shorter than first lever arm 13 and has one end pivotally secured by transverse pin 72 in ear 70 suitably fastened to overflow tube 20 and projecting outwardly, as shown in FIGS. 1, 4 and particularly in FIG. 5. Lever arm 74 is provided with a plurality of adjustment holes 80 and 82 spaced apart at a substantially equal distance from each other throughout the length thereof. While one end of second chain 76 may be connected to any of the inner holes 80, third chain 78 interconnects lever arm 74 with lower flap valve 46 inclined at a less acute angle to horizontal than flap valve 44, one end of chain 78 being attached by a suitable fastener similar to fastener 69 to one of the outer adjustment holes 82 in lever arm 74, the opposite end of chain 78 being attached to lower eyelet 52 secured to upper surface of flap valve 46. It is to be noted that chain 78 is maintained in a substantially taut condition between arm 74 and valve 46 regardless whether valve 46 is lifted from lower valve seat 42 or closing it.

Accordingly, it will be apparent that valve seats 40 and 42 may be unblocked independently of each other by depressing flush handle 12 selectively either partway or all the way thereby providing an accurate control for either partial or full flush operation to a user who senses distinctly some resistance in the movement of handle 12 when actuated to produce a partial flush.

Figure 2:
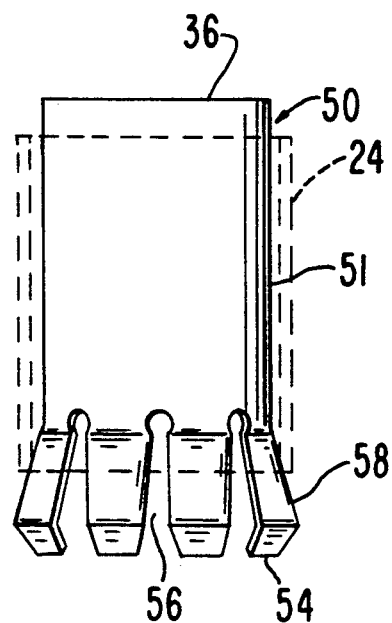
FIG. 2 is an enlarged view of the adapter mounted in a discharge pipe of a conventional toilet shown in dashed lines.

Another important feature of the invention is the provision of a novel adapter 50 illustrated particularly in FIG. 2 and also in FIGS. 3 and 5. Adapter 50 fits frictionally within discharge pipe 24 in alignment with drain opening 36 in bottom wall 18 of tank 10 in a firmly locked position. Adapter 50 is hollow and comprises a cylindrical upright portion 51 and a lower portion having a plurality of downwardly projecting rigid but somewhat resilient finger-like members 58, the upper portion of which is inclined outwardly, while the lower short portions 54 are inclined inwardly. Finger-like members 58 are capable of being compressed inwardly during the passage of adapter 50 downwardly through discharge pipe 24 and regain their original form after adapter 50 is fully inserted in pipe 24 and connected to the toilet bowl. Finger-like members 58 are spaced apart from each other by cuts 56 arranged therebetween around the periphery of cylindrical upright portion 51 which is adapted for a tight engagement with the inner surface of drain opening 36.

Adapter 50 may be readily inserted into drain opening 36 by pushing it slidingly by hand exerting some pressure in downward direction through discharge pipe 24 to a locked position whereby free end portions 54 of finger-like members 58 will project outside of discharge pipe 24 indicating that installation of adapter 50 is complete.

In operation of the dual valve assembly according to the invention, tank 10 conventionally filled with water is partially flushed by initially pressing down flush handle 12 until the user will feel resistance in the downward movement of handle 12 at which time flap valve 44 is lifted by chain 68 connected to lever arm 13 which is moved from its downwardly inclined position to upwardly inclined position. During such partial flush stage, second lever arm 74 and lower flap valve 46 associated therewith and covering outlet 34 remain in their original position. The partial flush is advantageous when when it is desired to dispose a liquid waste, as merely only about one-third of the total water volume in the tank is drained.

When it is desired to discharge solid waste admixed with liquid waste, tank 10 is totally flushed by further pressing down flush handle 12 until it is moved for its entire distance of travel. The total distance of movement of handle 12 in the second stage of flushing operation causes first lever arm 13 to be raised somewhat higher and second lever arm 74 to be raised by taut chain 76 interconnecting both arms for a distance sufficient to lift valve 46 from its seat 42 thereby opening lower inlet 34 and discharge substantially the entire volume of water from tank 10 into the toilet bowl. Following the partial or total flush action, tank 10 is refilled with water in a conventional manner for subsequent use.

It will be appreciated that the two-stage water flush operation described hereinabove is very simple and can be effected with minimum skill required by the user who will sense distinctly the initial resistance in the downward movement of flush handle 12 when a partial flush is desired and will press handle 12 a little further down to produce a total flush.

The body of the dual valve assembly in accordance with the invention may be manufactured from any suitable plastic material, such as polyethylene or ABS, by any well known molding procedure. Other structural components, i.e. valves and gaskets are usually made from soft rubber materials and lever arms and chains from conventional metals.

It will be apparent from the foregoing description that I have devised an improved dual flush valve assembly characterized by a new combination of elements, the assembly being highly advantageous for its basic function, i.e. reduction of water usage in toilets having tanks of varying capacities. The assembly may be easily installed in any existing toilet tanks without the necessity of using any tools by simply removing a single valve unit and replacing it with the unit of the invention. Furthermore, the low position of the lower valve closely adjacent the bottom wall of the tank causes a substantially complete discharge of the water contents in the tank by a full flush which is particularly advantageous for small size capacity tanks of 3½ gallons wherein just one full flush will remove solid waste from the toilet.

The holes provided in the first elongated lever arm and especially holes in the second shorter lever arm are useful for the user's convenience in adjustment of manual pressure to be exerted in either partial or full flush. While more pressure is required when the chain connected to the lower valve is attached to a hole in the second lever arm near the outflow pipe, less pressure is required when the same chain is suspended from a hole closer to the free end of the lever.

Due to simplicity of construction of its central body from a single plastic material suitable for being integrally molded into a one-piece unit combined with the specific arrangement of two actuating lever arms associated through three chains with a pair of flap valves, the overall manufacturing cost of the assembly may be maintained at a low level. In addition, it is significant that my assembly offers a substantial saving in the water consumption which is of utmost importance during a water crisis anywhere.

It will be understood that various changes or modifications in the form or in the constructional details of my invention as herein described may be made without departing from the spirit thereof or the scope of the claims which follow.

I claim:

1. A dual flush valve assembly adapted for partial flush or full flush of water in a toilet tank having a discharge pipe comprising, in combination:
    a) a hollow body including an open-top upright overflow tube;
    b) an upper inlet disposed in a central portion of said body;
    c) a lower inlet disposed in a lower portion of said body and closely adjacent the bottom of said tank;
    d) a first elongated actuating lever arm connected at one end thereof to a flush handle;
    e) a second actuating lever arm pivotally mounted at one end thereof to said overflow tube;
    f) said flush handle adapted to being rotatably mounted on a wall of said tank for downward movement;
    g) an upper flap valve pivotally mounted on said overflow tube and in flow control association with said upper inlet;
    h) a lower flap valve pivotally mounted on the lower end portion of said overflow tube and in flow control association with said lower inlet;
    i) a first chain connecting said first actuating arm with said upper flap valve;
    j) a second chain connecting said first actuating arm with said second actuating arm;
    k) a third chain connecting said second actuating arm with said lower flap valve;
    l) a drain opening in a bottom wall of said body for connection with said discharge pipe; and
    m) a hollow adapter depending from said body bottom wall in communication with said drain opening for connecting said drain opening in alignment with said discharge pipe, said adapter comprising a cylindrical upper portion and a lower portion having a plurality of downwardly and outwardly projecting resilient finger-like members, said adapter being sized to be inserted into said discharge pipe with said finger-like members resiliently engaging said discharge pipe.

2. An assembly of claim 1 wherein said body is of substantially L-shape having a generally vertically disposed first portion and a horizontally disposed second portion, said overflow tube being disposed between said first and second body portions.

3. An assembly of claim 1 wherein said first actuating lever arm extends laterally and downwardly beyond said overflow tube.

4. An assembly of claim 1 wherein said first actuating lever arm comprises a plurality of holes in the free end portion thereof.

5. An assembly of claim 1 wherein said second actuating arm is mounted in the central portion of said overflow tube and extends laterally for a short distance from said tube.

6. An assembly of claim 5 wherein said second actuating arm comprises a plurality of spaced apart holes adapted for attaching adjustably said second and third chain thereto.

7. An assembly of claim 1 wherein a partial flush is caused by pressing said flush handle downwardly a limited distance of movement to a point where resistance is felt by a user thereby lifting said upper flap valve.

8. An assembly of claim 1 wherein a full flush is caused by pressing said flush handle downwardly for a total distance of movement thereby raising said second actuating arm and lifting said second flap valve from said lower inlet.

9. An assembly of claim 1 wherein said second chain is in slack condition when said lower valve rests on said lower inlet.

10. An assembly of claim 1 wherein said second chain is in taut condition when said first valve is lifted from said upper inlet.

11. An assembly of claim 1 wherein said finger-like members comprise an upper portion inclined outwardly and a lower end portion inclined inwardly.

12. An assembly of claim 1 wherein the outer diameter of said cylindrical upper portion is adapted for a tight fit with the inner surface of said discharge pipe.

13. An assembly of claim 1 wherein said finger-like members are spaced apart from each other around the periphery of said cylindrical upright portion.

14. An assembly of claim 1 wherein said adapter is engageable in said discharge pipe by pushing slidingly said adapter downwardly to a locked position whereby said finger-like members will project outside of said discharge pipe.

15. An assembly of claim 1 wherein said finger-like members are compressible inwardly during passage thereof through said discharge pipe.

* * * * *